A. I. RISSER.
SPEED REDUCER.
APPLICATION FILED FEB. 11, 1913.
1,104,223.
Patented July 21, 1914.
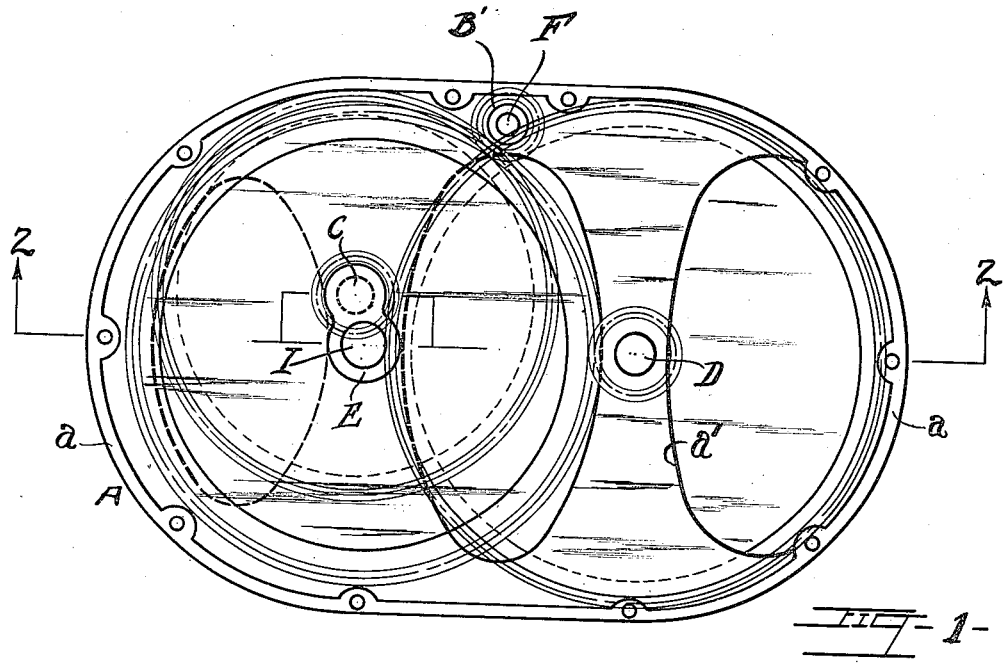
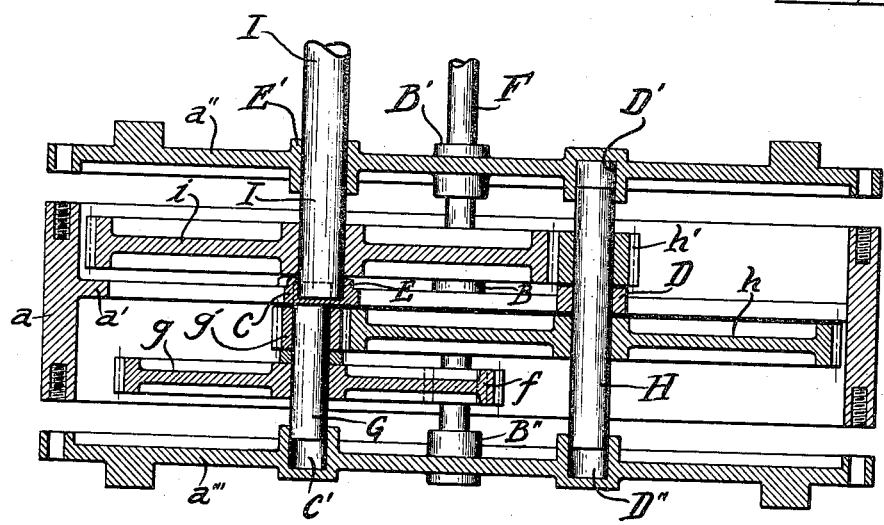
Witnesses:
Thomas J. Morgan Jr.
Charles B. Hebron
Inventor
Arthur I. Risser,
By Charles Turner Brown
Atty.

UNITED STATES PATENT OFFICE.

ARTHUR I. RISSER, OF CHICAGO, ILLINOIS.

SPEED-REDUCER.

1,104,223.   Specification of Letters Patent.   Patented July 21, 1914.

Application filed February 11, 1913. Serial No. 747,622.

*To all whom it may concern:*

Be it known that I, ARTHUR I. RISSER, a citizen of the United States, and a resident of Chicago, in the county of Cook and State of Illinois, have invented certain new and useful Improvements in Speed-Reducers, of which the following is a specification.

This invention relates to devices which are used to reduce the speed of the shaft of small motors to a much slower speed, and one suitable for the driving shaft of comparatively slow moving machinery.

The object of this invention is to obtain a speed reducer which will not get out of order, will not be liable to break, will not occupy much space, and may be installed where it is liable to have water thrown or dripped thereon, or be exposed to the elements.

A further object is to obtain a speed reducer which will not cause any considerable loss of power in the friction of the several parts, and which will not require much attention on the part of the operator of the machine which is driven thereby.

In the drawings accompanying and forming a part hereof Figure 1 is a top plan view of the device with the top removed to expose the movable parts thereof to view. Fig. 2 is a vertical sectional view, on line 2—2 of Fig. 1, viewed in the direction indicated by the arrows.

A reference character applied to designate a given part indicates said part throughout the several figures of the drawings.

A is the shell or casing of the device, and comprises the circumferential wall $a$, having partition wall $a'$, which I make integral with said circumferential wall, by casting said walls of iron, the top $a''$ and the bottom $a'''$. Partition wall $a'$ is provided with apertures through which a lubricant may flow freely. The top $a''$ and bottom $a'''$ are respectively secured tightly in place to the circumferential wall $a$ by means of bolts A'. Partition wall $a'$ is provided with the journal bearings B, C, D and E. Top $a''$ is provided with journal bearings B' and E', which extend entirely therethrough, and with journal bearing D' which is not required to extend therethrough. Bottom $a'''$ is provided with journal bearings B'', C' and D''.

F is the driving shaft of the device, and is journaled in bearings B, B' and B''.

$f$ is a gear wheel which is secured on shaft F to turn therewith.

G is a driven shaft which is journaled in bearings C, C'.

$g$ is a gear wheel on shaft G, secured to turn therewith, which is adapted to intermesh with gear $f$.

$g'$ is an additional gear wheel secured on shaft G to turn therewith.

H is an additional shaft which is journaled in bearings D, D' and D''.

$h$ is a gear wheel on shaft H, secured thereto to turn therewith, and adapted to intermesh with gear wheel $g'$.

$h'$ is an additional gear wheel secured on, to turn with shaft H.

I is an additional shaft mounted in bearings E and E', and constitutes the driven shaft which is connected by any suitable means to the machine which is to be actuated by the device.

$i$ is a gear wheel on and turning with shaft I, and said gear wheel $i$ intermeshes with gear wheel $h'$.

J, J are bosses on the upper face of top $a''$ and the lower face of bottom $a'''$, and are used merely to provide a base on which the device may rest, and it will be noted that the terms top and bottom hereinbefore used by me are relative terms, used merely for descriptive purposes, as the device works equally well when placed so that the top, as illustrated, forms the bottom on which it rests.

The shaft F being, as described, the driving shaft of the device is itself driven and I place bearing B' in top $a''$ so that the wheel by which said shaft is driven may be placed near to a journal bearing. Gear wheel $f$, on said shaft F is also placed between two bearings, D' and D''. Gear wheels $g$ and $g'$ on shaft G are placed close together, and between the bearings C' and C', and close thereto. Gear wheel $h$ is placed between bearings D and D''; and gear wheel $h'$ is placed between bearings D and D'; while gear wheel $i$ on shaft I is between the bearings E and E'. As thus constructed the several gear wheels are close to the bearings of the shafts thereof and said shafts are not liable to be sprung by said gear wheels.

When the several parts are assembled the bottom $a'''$ is secured firmly in place by bolts A', with shafts F, G and H in their respective journal bearings. The entire shell is then filled with what is now known in the art as transmission oil, and the top $a''$ is put in place and secured firmly by bolts A'. When the device is thus made and filled with transmission oil it can be run for a comparatively long while without attention of any kind whatever, with no wear on the teeth of the gear wheels or to the bearings and shafts; and I find, in addition thereto, that but little loss occurs in the transmission of power therethrough.

I claim:

In a speed reducer, a gear casing comprising a circumferential wall, a partition wall midway the ends of said circumferential wall and integral therewith, and end walls removably attached to said ends of said circumferential wall, said end walls being respectively provided with journal bearings on the inner faces thereof and said partition wall being also provided with journal bearings, some of said journal bearings in said partition and end walls being in alinement, and one of said end walls being also provided with journal bearings extending therethrough.

ARTHUR I. RISSER.

Witnesses:
FRANK SACKSTEDER,
CHARLES TURNER BROWN.